United States Patent [19]

Seto

[11] Patent Number: 5,623,515
[45] Date of Patent: Apr. 22, 1997

[54] DATA COMMUNICATION SYSTEM FOR REDUCING A RISK OF TRANSMISSION ERRORS

[75] Inventor: Kenichi Seto, Kanagawa-Ken, Japan

[73] Assignee: U.S. Philips Corporation, New York, N.Y.

[21] Appl. No.: 269,809

[22] Filed: Jun. 30, 1994

[30] Foreign Application Priority Data

Jul. 6, 1993 [JP] Japan .................................. 5-191586

[51] Int. Cl.$^6$ .................................................... H04B 3/00
[52] U.S. Cl. ........................ 375/257; 375/238; 375/259; 375/309; 375/316; 375/377; 340/445; 340/825.63; 340/870.24
[58] Field of Search ..................................... 375/238, 239, 375/257, 259, 285, 309, 340, 316, 377; 370/8, 9, 44; 371/1; 332/106, 107, 109, 112; 340/870.18, 870.19, 870.24, 825.63, 825.57, 445

[56] References Cited

U.S. PATENT DOCUMENTS 3,959,772  5/1976  Wakasa et al. ................... 340/825.63
4,935,738  6/1990  Pilato ............................... 340/870.24

OTHER PUBLICATIONS

Philips Technical Review, 1965, pp. 268–284.

*Primary Examiner*—Stephen Chin
*Assistant Examiner*—Amanda T. Le
*Attorney, Agent, or Firm*—Debra K. Stephens

[57] ABSTRACT

A data communication system comprises a main device with a first microcomputer and an operating device with a second microcomputer. The devices are connected to each other by a first wire and by a second wire. In addition to that, input interrupt terminals of both devices are connected to the second wire. One device starts the sending of data by pulling the second wire to a first level, the detection of this by the other device is signalled back via the first wire and both devices then start an internal timer. When a predetermined time, corresponding to a data item to be sent, has lapsed the sending device pulls the second line again to the first level. This is detected by the other device, which measures the lapsed time and which uses this time to determine the data item sent by consulting preset conversion rules, that give a relation between time and a data element.

6 Claims, 4 Drawing Sheets

| DATA | TIME (μs) |
|---|---|
| 0 | 50 |
| 1 | 90 |
| 2 | 130 |
| 3 | 170 |
| 4 | 210 |
| 5 | 250 |
| 6 | 290 |
| 7 | 330 |
| 8 | 370 |
| 9 | 410 |
| A | 450 |
| B | 490 |
| C | 530 |
| D | 570 |
| E | 610 |
| F | 650 |

FIG. 6 (TAB. 1)

FIG. 7 (TAB. 2)

| STEP | MAIN MICON | | | | SUB-MICON | | | |
|---|---|---|---|---|---|---|---|---|
| | L1 | | L2 | | L1 | | L2 | |
| | INPUT AND OUTPUT | LEVEL | INPUT AND OUTPUT | LEVEL | INPUT AND OUTPUT | LEVEL | INPUT AND OUTPUT | LEVEL |
| INITIAL CONDITION | IN | H | IN | H | IN | H | IN | H |
| (a) | " | " | OUT | L | " | " | " | " |
| (b) | " | " | " | " | " | " | " | " |
| (c) | " | " | " | H | OUT | L | " | " |
| (d) | " | " | " | L | " | H | " | " |
| (e) | " | " | " | " | " | L | " | " |
| (f) | " | " | " | H | " | H | " | " |
| (g) | " | " | " | L | " | " | " | " |
| (h) | " | " | " | " | " | L | " | " |
| (i) | " | " | IN | " | IN | " | " | " |

DATA COMMUNICATION SYSTEM FOR REDUCING A RISK OF TRANSMISSION ERRORS

FIELD OF THE INVENTION

The present invention relates to a data communication system including: a first device having a first terminal, a second terminal and an input interrupt terminal; a second device having a third terminal, a fourth terminal and a further input interrupt terminal; a first interconnection between the first terminal and the third terminal; and a second interconnection between the second and the fourth terminal.

BACKGROUND ART

Such a data communication system is known in a mobile radio installation, for example an amateur radio mounted in a car. In a mobile radio installation, there are many pieces of radio communication equipment which are so arranged as to be suitable for mounting in a vehicle. The radio communication installation is separated into a main device which has built therein transmitting and receiving functions and a display/operating device (hereinafter referred to as "operating device") which controls operation of the main device. The operating device is mounted in the limited driver space and is connected to the main device through a cable. A microphone for communication and switches for controlling the main device are mounted in the operating device. This makes it necessary to send and receive data through the cable.

The main device of the radio communication equipment is provided with a master or main microcomputer while the operating device is provided with a slave or sub-microcomputer. The arrangement is such that required computation is carried out by each microcomputer, whereby data are transmitted between the main device and the operating device through a cable. The transmission is carried out serially under control of a clock signal. The transmission is based on a signal with a square waveform, such that a particular level of the signal corresponds to the presence of a bit. The cable connecting the two microcomputers has an internal capacitance, because of which the waveform of the signal is deformed. This deformation makes it difficult to precisely detect the presence of bits and introduces a risk for transmission errors. A way to improve the detection would be to lower the frequency of the clock signal but this reduces the data transmission rate.

OBJECT OF THE INVENTION

It is inter alia an object of the invention to provide a data communication system which reduces the risk of transmission errors without introducing a reduction in speed of sending and receiving data.

SUMMARY OF THE INVENTION

In order to achieve this object, the present invention provides a data communication system as described earlier, characterized in such that the input interrupt terminal and the further input terminal are connected to the second interconnection, that the system has means to execute the steps:

a) the first device sets the second terminal to a first level, b) next, the second device sets the third terminal to a first level, c) next, the first device sets the second terminal to a second level and the second device sets the third terminal to a second level, d) a predetermined time after step b), whose length is corresponding to a data item to be sent, the first device sets the second terminal to the first level, e) from said length and based on preset conversion rules, the second device obtains the data item.

An advantage of a system according to the invention is that the risk of transmission errors is reduced, while the transmission speed has not been reduced.

In a data communication system according to the present invention the type of a transition that marks the begin of the interval corresponding with a data element to be transmitted is the same as the type of a transition that marks the end of the interval. Because of this, a system according to the invention does not experience problems with skewed waveforms like known systems do.

BRIEF DESCRIPTION OF THE DRAWING

The invention is explained below by way of example and with reference to the accompanying drawing, wherein:

FIG. 6 (Table 1) shows a conversion table between the data to be transferred and the time corresponding to a specific interval of events on the communication lines according to the invention;

FIG. 7 (Table 2) shows input and output states and levels of the main microcomputer and sub-microcomputer for the steps of the operation according to the invention.

Throughout the drawing same reference numerals indicate similar or corresponding features.

DETAILED DESCRIPTION

Figure 1:
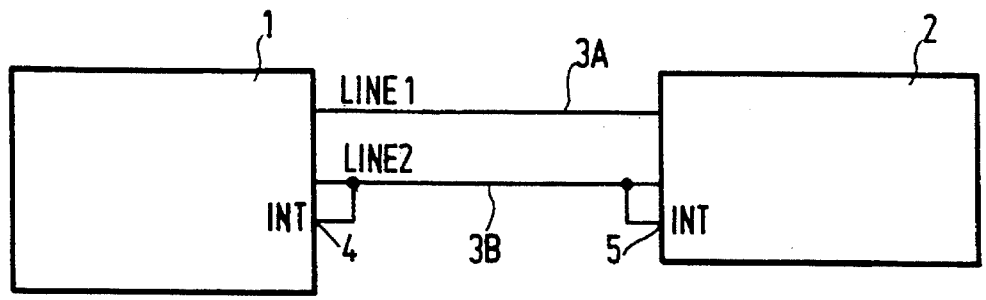
FIG. 1 is a block diagram showing an embodiment of a data transmission system according to the invention.

FIG. 1 is a block diagram showing an embodiment of a data communication system according to the invention. The reference numeral 1 denotes a main device which has a master microcomputer (main microcomputer). The reference numeral 2 denotes an operating device which has a slave microcomputer (sub-microcomputer). The main device 1 and the operating device 2 are connected to each other by two wires including a first communication wire 3A and a second communication wire 3B. The wires 3A and 3B are connected to terminals (ports) of the main microcomputer and sub-microcomputer. Those terminals are bidirectional and can therefore be used as input or output terminals depending on the direction of the transmission. Furthermore, the second communication wire 3B is also connected to the external interrupt terminals (INT) 4 and 5 of the respective microcomputers. The arrangement of the communication wires facilitates a serial transfer of data between the main device 1 and the operating device 2. In the present embodiment, as shown in Table 1, a corresponding relationship (conversion table) between data to be transferred and time is set, whereby the time corresponds to a specific interval of events on the first and second communication wires 3A and 3B as described below.

Figure 2:
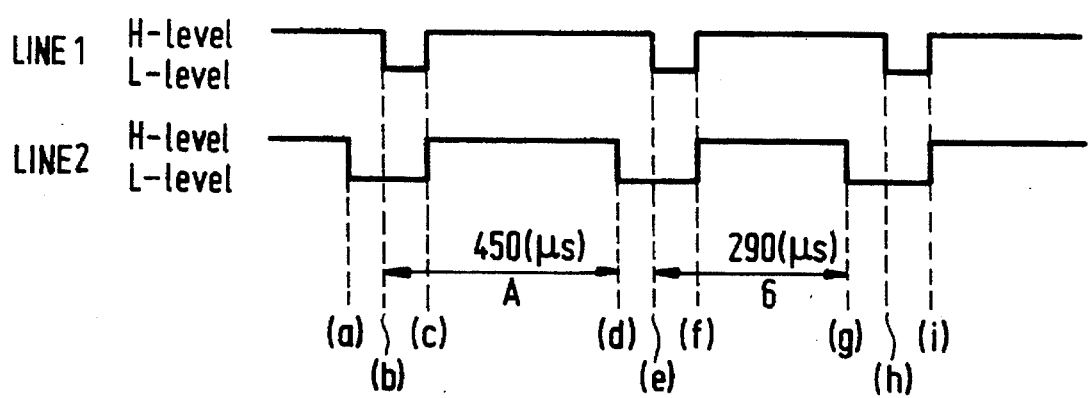
FIG. 2 is a timing chart or describing operation of the embodiment.

FIG. 2 is a timing chart showing the operation of the data communication system according to the present embodiment. Here, a description is given of an example in which data are transmitted from the main device 1 to the operating device 2 in a serial manner. In this example, the data to be transmitted includes 'A6' in the hexadecimal system. Accordingly, each data element in Table 1 represents a hexadecimal value. Moreover, Table 2 shows input and output states and levels of the main microcomputer and sub-microcomputer for all steps of the operation as described below. L1 is a first communication wire and L2 is a second communication wire. First, under an initial condition, the respective microcomputers are both such that terminals connected to L1 and L2 are brought to an input state, and external interrupt terminals INT 4 and 5 are so set that the last transition timing in FIG. 2 can be detected. In this connection, L1 and L2 are pulled up to an H-level. This is a protection to prevent microcomputers from malfunctioning because of external noise. This could happen in a situation where the terminals of the respective microcomputers are left unattended, while changing to input. The respective terminals are fixed to the H-level for example through resistors, which can be easily realized.

Subsequently, the terminal of L2 of the main microcomputer is set to output in step (a) to output the L-level. At this time, the sub-microcomputer enters interrupt processing by interruption on the INT terminal 5. Subsequently, the sub-microcomputer sets the terminal of L1 to output state to output the L-level in order to indicate that the interrupt processing has been entered in step (b). At this time, the main microcomputer detects the transition of L1 to the L-level through its terminal connected to L1. Then, the main microcomputer and the sub-microcomputer simultaneously trigger the incorporated timer function to start a count operation. Subsequently, in step (c), the main microcomputer returns the terminal connected to L2 to the H-level, and the sub-microcomputer returns the terminal of L1 to the H-level. Subsequently, in step (d), the main microcomputer changes the terminal connected to L2 to an L-level after a time corresponding to A of 'A6', the data to be transmitted, which is 450 µs as will be clear from Table 1. At that time, since the terminal of the sub-microcomputer connected to L2 is in the input state, the transition to the L-level is detected by the sub-microcomputer. The value of its timer, which is also 450 µs, is read and Table 1 is referred to in order to convert the time read to the data A. Thus, the data A has been transmitted from the main device 1 to the operating device 2.

Subsequently, in step (e), after having received the data A, the sub-microcomputer of the operating device 2 brings the terminal L1 to the L-level, and resets its timer to start again. Also, the main microcomputer reads that the wire L1 has been brought to the L-level, and resets its timer to start again. Subsequently, in step (f), operation similar to step (c) is performed. Subsequently, in step (g), operation similar to step (d) is performed. The main microcomputer changes the terminal of L2 to the L-level at the time the timer reaches the time corresponding to 6 of 'A6, which is 290 µs as will be clear from Table 1. The sub-microcomputer detects the L-level and reads the value of 290 µs from its timer. Subsequently, in step (h), after the data 6 has been received, the sub-microcomputer brings the terminal of L1 to the L-level. Thus, communication ends and the data 'A6' has been transmitted from the main device 1 to the operating device 2. Subsequently, in step (i), the main microcomputer returns L2 to the input setting, and the sub-microcomputer returns L1 to the input setting, whereby similar data communication is made possible. For example, the time is measured by the timer further continuously, referring to Table 1 so that communication of a multitude of data such as 'A63982' is made possible.

In this manner, according to the embodiment, the arrangement is as follows. That is, the line which connects the main device 1 having the main microcomputer and the operating device 2 having the sub-microcomputer to each other is formed by the first communication wire 3A and the second communication wire 3B. The second communication wire 3B is connected to the external interrupt terminals 4 and 5 of the respective microcomputers in parallel thereto. In addition to the fact that the corresponding relationship between the time and the data is previously set, the terminal of the second communication wire 3B of the main microcomputer and the terminal of the first communication wire 3A of the sub-microcomputer are both set to the output state. On the basis of the time from the moment both terminals last changed to the same L-level subsequently to the moment at which the terminal of the main microcomputer is returned to the L-level after the terminal of the main microcomputer and the terminal of the sub-microcomputer have been both changed to the H-level, the time is converted to the predetermined data and is read, referring to the corresponding relationship in the terminal of the second communication wire of the sub-microcomputer. Accordingly, it is possible to reduce the chance on transmitting and receiving errors, without introducing a reduction in speed of transmission and receiving.

In a data communication system according to the present invention the type of transitions that mark the interval corresponding with a data element to be transmitted are the same. In the preferred embodiment, both the start of the interval and the end of interval are marked by a transition from the H-level to the L-level. In case a waveform becomes skewed, a system according to the invention does not experience problems like known systems thanks to these measurements.

Figure 3:
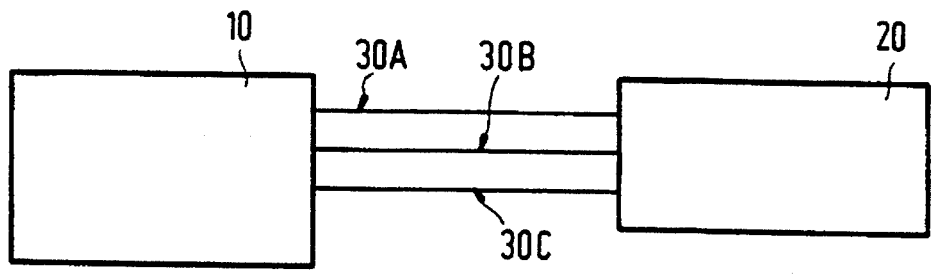
FIG. 3 is a block diagram showing a conventional example.

FIG. 3 is a block diagram describing a conventional data communication system in a case where the data are transmitted and received in this manner. As an example, it shows a main device 10 and an operating device 20 connected to each other through three wires including a first communication wire 30A, a second communication wire 30B and a third communication wire 30C whereby data are transmitted and received in a serial manner.

Figure 4:
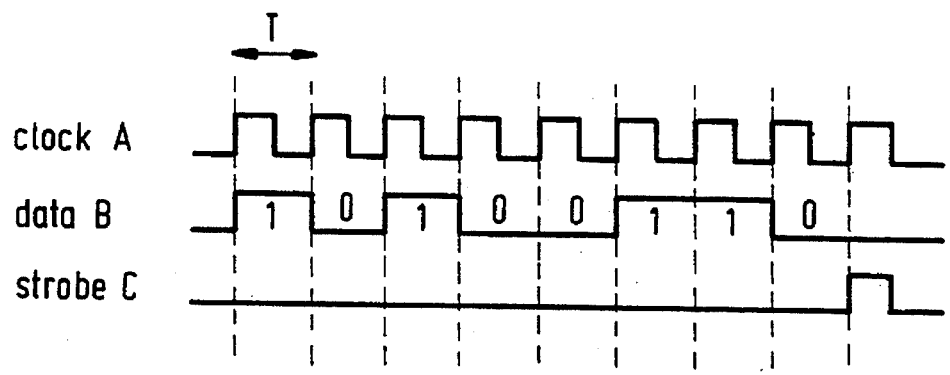
FIG. 4 is a waveform view for describing operation of the conventional example.

As shown in FIG. 4, a clock A, data B and a strobe C are supplied to the first, second and third communication wire respectively. For example, in a case where data are transmitted from the main device 10 to the operating device 20 in a serial manner, the data B are transmitted every one bit (a high level H or a low level L) in synchronization with one cycle T of the clock A. When the transmission of predetermined bits (in the present example the 8 bits '10100110'= A6$_{16}$) has been completed, the strobe C is transmitted. The arrangement is such that for the transmission of a series of data a strobe C is transmitted each time a predetermined number bits has been transmitted in this manner.

In the case where the data are transmitted and received under clock synchronization using the three wire system as described before, an extension of the communication wire (a microphone cable or the like) causes the waveforms of the clock A and the data B to become skewed. This creates a problem for the transmission of data because errors can easily be introduced in this way.

Figure 5:
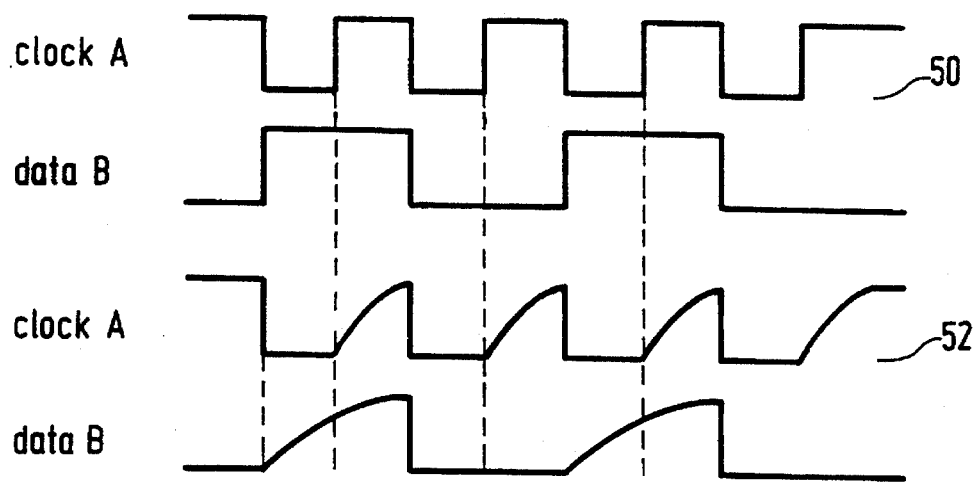
FIG. 5 is a waveform view for describing operation of the conventional example.

FIG. 5 shows such a skewed waveform. Ideally, each waveform maintains a rectangular form as indicated by 50. However, in a case where the microphone cable or the like is extended, the internal capacitance of the cable increases with the length of the cable. The internal capacitance of the cable causes a deformation of the waveform. The transition to high appears to be late as shown by 52, because the waveform becomes skewed and the high level is reached later than expected. As a result, in a case where data are read based on timing the transition of the waveform, it becomes difficult to clearly define high (the H-level) and low (the L-level). Accordingly, an error can occur in reading the data. In order to avoid such problem, it is an option to reduce the frequency of the clock A. However, in that case a disadvantage occurs that the speed of sending and receiving is reduced.

The invention has been described in the text using an example in which data are transmitted from the main device to the operating device. However, the invention can similarly be applied in the situation where the data are transmitted in the opposite direction.

I claim:

1. A data communication system comprising:

a first device having a first terminal, a second terminal and an input interrupt terminal;

a second device having a third terminal, a fourth terminal and a further input interrupt terminal;

a first interconnection between the first terminal and the third terminal; and a second interconnection between the second and the fourth terminal, such that the input interrupt terminal and the further input terminal are connected to the second interconnection and such that said data communication system executes the following steps:

a) the first device sets the second terminal to a device1 first level, b) the second device sets the third terminal to a device2 first level, c) the first device sets the second terminal to a device1 second level and the second device sets the third terminal to a device2 second level, d) a predetermined time after step b), whose length is corresponding to a data item to be sent, the first device sets the second terminal to the device1 first level, and e) from said length and based on preset conversion rules, the second device obtains the data item.

2. A data communication system according to claim 1, wherein:

the device1 first level is a low level and the device1 second level is a high level; and the device2 first level is a low level and the device2 second level is a high level.

3. The first device in the system of claim 1 or 2, wherein said first device executes the steps:

3a) sets the second terminal to the first device1 level, 3b) detects when the first terminal is externally set to the device2 first level, 3c) sets the second terminal to the device1 second level, and 3d) after a predetermined time, corresponding to a data item to be sent and based on the preset conversion rules, sets the second terminal to the device1 first level.

4. The second device in the system of claim 1 or 2, wherein the second device executes the steps:

4a) upon detecting the device1 first level on the further input interrupt terminal, sets the third terminal to the device2 first level, 4b) sets the third terminal to the device2 second level, 4c) upon detecting the device1 first level on the further input interrupt terminal, determines a lapsed time since step 4a), and 4d) based on the lapsed time, utilizes the preset conversion rules to obtain a data item.

5. The first device in the system of claim 2, characterized in that the first device executes the steps:

5a) sets the second terminal to the device1 first level, 5b) detects when the first terminal is externally set to the device2 first level, 5c) sets the second terminal to the device1 second level, and 5d) after a predetermined time, corresponding to a data item to be sent and based on the preset conversion rules, sets the second terminal to the device1 first level.

6. The second device in the system of claim 2, characterized in that the second device executes the steps:

6a) upon detecting the device1 first level on the further input interrupt terminal, sets the third terminal to the device2 first level, 6b) sets the third terminal to the device2 second level, 6c) upon detecting the device1 first level on the further input interrupt terminal, determines a lapse time since step 6a), and 6d) based on the lapsed time, utilizes the preset conversion rules to obtain a data item.

* * * * *